(12) United States Patent
Wicker

(10) Patent No.: US 11,050,878 B1
(45) Date of Patent: Jun. 29, 2021

(54) METHODS, SYSTEMS AND COMPUTER PROGRAM PRODUCTS FOR DETECTING ANOMALIES IN A TELECOMMUNICATIONS NETWORK

(71) Applicant: Bandwidth, Inc., Raleigh, NC (US)

(72) Inventor: Ethan Wicker, Denver, CO (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 17/197,411

(22) Filed: Mar. 10, 2021

(51) Int. Cl.
*H04M 3/36* (2006.01)
*H04M 3/22* (2006.01)

(52) U.S. Cl.
CPC ........... *H04M 3/36* (2013.01); *H04M 3/2218* (2013.01); *H04M 3/2227* (2013.01)

(58) Field of Classification Search
CPC ..... H04M 3/36; H04M 3/2218; H04M 3/2227
USPC .......................................................... 379/134
See application file for complete search history.

(56) References Cited

U.S. PATENT DOCUMENTS

| | | | | |
|---|---|---|---|---|
| 2005/0064848 | A1* | 3/2005 | Kim | H04M 1/56 455/414.1 |
| 2007/0172037 | A1* | 7/2007 | Kreckel | H04M 15/43 379/111 |
| 2007/0263794 | A1* | 11/2007 | Mocenigo | H04M 3/493 379/67.1 |
| 2008/0226044 | A1* | 9/2008 | Johnson | H04Q 3/0087 379/93.12 |
| 2016/0359691 | A1* | 12/2016 | Huntley | G06F 3/04847 |
| 2019/0020757 | A1* | 1/2019 | Rao | H04M 3/51 |
| 2019/0281167 | A1* | 9/2019 | Richards | G06F 9/5016 |

* cited by examiner

*Primary Examiner* — Binh Kien Tieu
(74) *Attorney, Agent, or Firm* — Stanek Lemon Crouse + Meeks; Gregory Stephens

(57) ABSTRACT

Methods for detecting anomalies in a telecommunications network are provided. The methods include calculating a call duration for each of a plurality of calls associated with a corresponding call detail record (CDR). Each CDR provides details associated with a single call in a plurality of fields. Each of the plurality of calls are categorized based on the calculated call duration for each call such that each of the plurality of calls is assigned to a duration bin, each duration bin including calls having similar calculated call durations. The CDRs are grouped using the duration bins and at least one carrier and/or a telecommunications provider. A plurality of summary statistics are calculated for each of the plurality of CDR groups. The calculated plurality of summary statistics are analyzed to determine whether an anomaly is present. Among other remedial measures, an external ticket may be generated informing affected carriers when an anomaly is present.

29 Claims, 9 Drawing Sheets

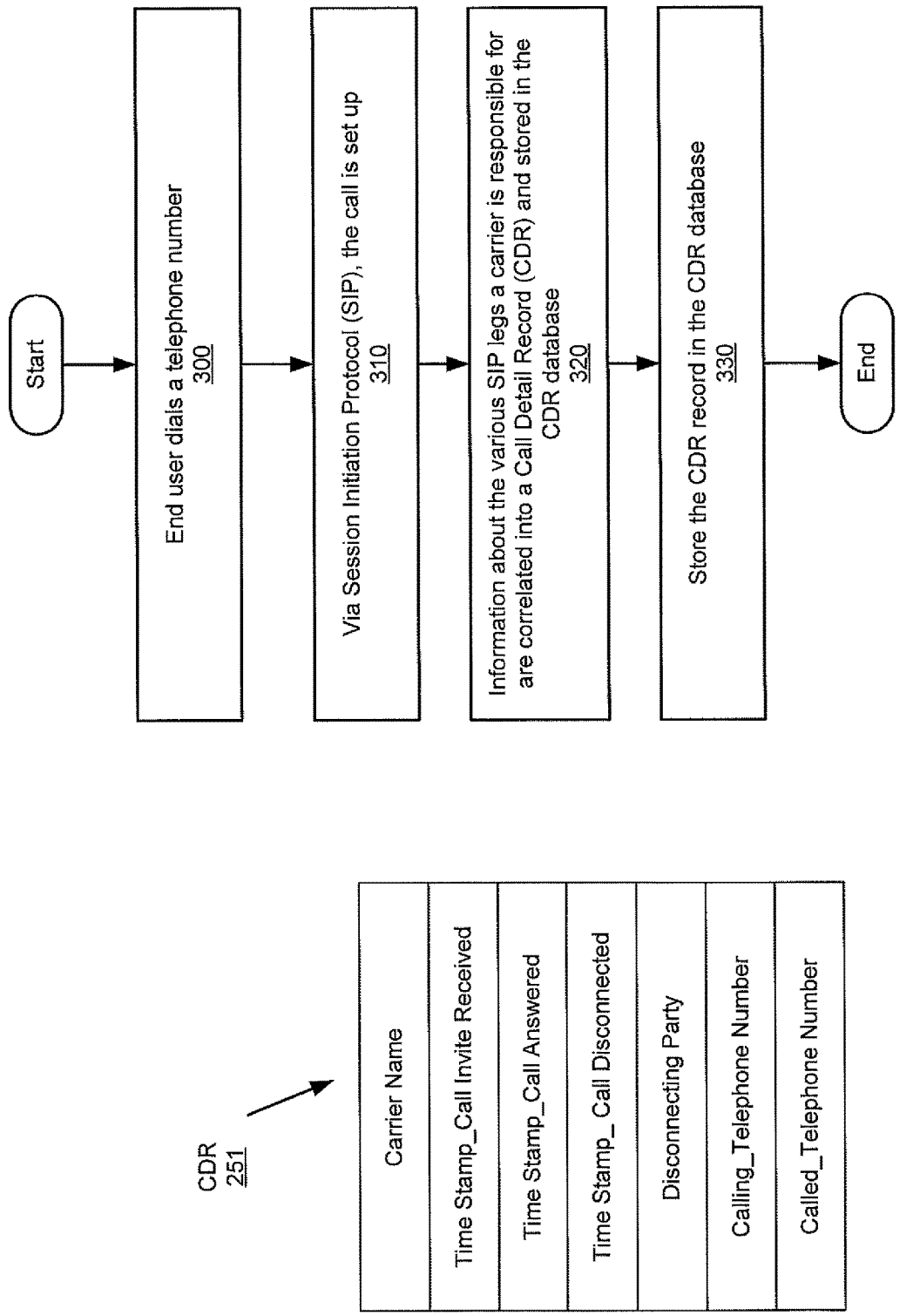

| A | B | C |
|---|---|---|
| Time Stamp_Call Answered | Time Stamp_Call Disconnected | Call Duration (minutes) |
| 2019-07-18 13:36:12 | 2019-07-18 14:06:31 | 30.3 |
| 2019-07-17 16:56:35 | 2019-07-17 17:27:05 | 30.5 |
| 2019-07-15 13:01:49 | 2019-07-15 13:32:22 | 30.5 |
| 2019-07-15 15:29:57 | 2019-07-15 16:00:37 | 30.6 |
| 2019-07-17 16:03:46 | 2019-07-17 16:34:36 | 30.8 |
| 2019-07-16 11:29:07 | 2019-07-16 12:00:22 | 31.2 |
| 2019-07-18 08:54:51 | 2019-07-18 09:26:03 | 31.2 |
| 2019-07-16 12:53:42 | 2019-07-16 13:24:56 | 31.2 |
| 2019-07-17 11:39:28 | 2019-07-17 12:11:00 | 31.5 |
| 2019-07-17 07:30:28 | 2019-07-17 08:02:17 | 31.8 |
| 2019-07-16 13:02:19 | 2019-07-16 13:35:12 | 32.8 |
| 2019-07-16 12:46:41 | 2019-07-16 13:19:34 | 32.8 |
| 2019-07-16 13:35:49 | 2019-07-16 14:08:38 | 32.8 |
| 2019-07-16 13:27:45 | 2019-07-16 14:01:54 | 34.1 |
| 2019-07-18 10:32:43 | 2019-07-18 11:07:01 | 34.3 |
| 2019-07-15 05:25:54 | 2019-07-15 06:00:20 | 34.4 |
| 2019-07-17 10:26:37 | 2019-07-17 11:01:21 | 34.7 |
| 2019-07-18 09:57:31 | 2019-07-18 10:32:40 | 35.1 |
| 2019-07-15 14:36:24 | 2019-07-15 15:12:12 | 35.8 |
| 2019-07-18 12:55:03 | 2019-07-18 13:31:04 | 36.0 |
| 2019-07-15 13:54:50 | 2019-07-15 14:30:59 | 36.1 |

Fig. 5

| A | B | C | D | E |
|---|---|---|---|---|
| Carrier Name | Call Duration (minutes) | Proportional Change in Number Calls | Proportional of Calls Redialed | Proportional of Calls with BYE from Called Number Party |
| Carrier A | 25.0 | 1.0404624 | 0.01851852 | 0.7777778 |
| Carrier A | 25.1 | 0.8031342 | 0.04878049 | 0.8536585 |
| Carrier A | 25.2 | 0.9523810 | 0.06250000 | 0.8333333 |
| Carrier A | 25.3 | 1.2377210 | 0.04761905 | 0.8412698 |
| Carrier A | 25.4 | 0.8782435 | 0.09090909 | 0.9090909 |
| Carrier A | 25.5 | 0.9590410 | 0.02083333 | 0.6666667 |
| Carrier A | 25.6 | 1.0578842 | 0.11320755 | 0.7735849 |
| Carrier A | 25.7 | 1.1550152 | 0.17543860 | 0.8245614 |
| Carrier A | 25.8 | 1.2084592 | 0.10000000 | 0.8333333 |
| Carrier A | 25.9 | 0.9447236 | 0.06382979 | 0.7659574 |
| Carrier A | 26.0 | 1.0707071 | 0.05660377 | 0.7547170 |
| Carrier A | 26.1 | 0.9137056 | 0.24444444 | 0.7333333 |
| Carrier A | 26.2 | 0.8208208 | 0.02439024 | 0.8048780 |
| Carrier A | 26.3 | 0.9696970 | 0.02083333 | 0.7916667 |
| Carrier A | 26.4 | 0.8151093 | 0.07317073 | 0.8780488 |
| Carrier A | 26.5 | 1.1683168 | 0.03389831 | 0.8135593 |

Fig. 6

| A | B | C | D | E | F |
|---|---|---|---|---|---|
| Carrier Name | Call Duration (minutes) | Proportional Change in Number Calls | Proportional of Calls Redialed | Proportional of Calls with BYE from Called Number Party | Local Outlier Factor |
| Carrier A | 25.0 | 1.0404624 | 0.01851852 | 0.7777778 | 1.0339451 |
| Carrier A | 25.1 | 0.8031342 | 0.04878049 | 0.8536585 | 1.0316103 |
| Carrier A | 25.2 | 0.9523810 | 0.06250000 | 0.8333333 | 0.9630355 |
| Carrier A | 25.3 | 1.2377210 | 0.04761905 | 0.8412698 | 1.0620578 |
| Carrier A | 25.4 | 0.8782435 | 0.09090909 | 0.9090909 | 1.1527524 |
| Carrier A | 25.5 | 0.9590410 | 0.02083333 | 0.6666667 | 1.2142120 |
| Carrier A | 25.6 | 1.0578842 | 0.11320755 | 0.7735849 | 1.1040727 |
| Carrier A | 25.7 | 1.1550152 | 0.17543860 | 0.8245614 | 1.0373880 |
| Carrier A | 25.8 | 1.2084592 | 0.10000000 | 0.8333333 | 1.0300879 |
| Carrier A | 25.9 | 0.9447236 | 0.06382979 | 0.7659574 | 0.9768673 |
| Carrier A | 26.0 | 1.0707071 | 0.05660377 | 0.7547170 | 1.0324565 |
| Carrier A | 26.1 | 0.9137056 | 0.24444444 | 0.7333333 | 1.0418065 |
| Carrier A | 26.2 | 0.8208208 | 0.02439024 | 0.8048780 | 1.0752574 |
| Carrier A | 26.3 | 0.9696970 | 0.02083333 | 0.7916667 | 1.0339386 |
| Carrier A | 26.4 | 0.8151093 | 0.07317073 | 0.8780488 | 1.0340820 |
| Carrier A | 26.5 | 1.1683168 | 0.03389831 | 0.8135593 | 0.9962123 |

Fig. 8

| A | B | C | D | E | F |
|---|---|---|---|---|---|
| Carrier Name | Call Duration (minutes) | Proportional Change in Number Calls | Proportional of Calls Redialed | Proportional of Calls with BYE from Called Number Party | Local Outlier Factor |
| Carrier A | 90.1 | 9.6153846 | 0.50666667 | 0.9866667 | 8.920783 |
| Carrier A | 120.1 | 9.8333333 | 0.50847458 | 1.0000000 | 8.545576 |
| Carrier A | 100.1 | 7.1052632 | 0.55555556 | 1.0000000 | 6.400500 |
| Carrier A | 120.0 | 4.7457627 | 0.57142857 | 1.0000000 | 4.472041 |
| Carrier A | 100.0 | 5.2631579 | 0.60000000 | 1.0000000 | 4.444455 |
| Carrier A | 60.1 | 4.4041451 | 0.52941176 | 0.9294118 | 4.096353 |

Fig. 9

METHODS, SYSTEMS AND COMPUTER PROGRAM PRODUCTS FOR DETECTING ANOMALIES IN A TELECOMMUNICATIONS NETWORK

FIELD

The present inventive concept generally relates to telecommunications networks and, more particularly, to quality of service provided by carriers associated with the telecommunication networks.

BACKGROUND

Telecommunication carriers generally have contracts with customers that guarantee a specific level of service, i.e. Quality of Service (QoS). When the quality of service falls below a particular threshold, customers may look for new carriers that can provide the quality of service they require. Telecommunications networks are complex, and performance of the network may be affected by any number of activities in the network. For example, some telecommunication carriers provide features to reduce cost, but these features may inadvertently interfere with the level of service provided. In other words, "anomalies" may occur in the network that cause unforeseen problems.

SUMMARY

Some embodiments of the present inventive concept provide methods of detecting anomalies in a telecommunications network by analyzing details associated with calls made in the telecommunications network. The methods include calculating a call duration for each of a plurality of calls associated with a corresponding call detail record (CDR). Each CDR provides details associated with a single call in a plurality of fields. The plurality of fields may include a time stamp indicating when a call invite is received; a time stamp indicating when the call was answered; a time stamp indicating when the call was disconnected; an indication of which party to the call disconnected the call; a telephone number of a calling party and a telephone number of a called party. Each of the plurality of calls may be categorized based on the calculated call duration for each call such that each of the plurality of calls is assigned to a duration bin, each duration bin including calls having similar calculated call durations. The CDRs may be grouped using the duration bins and at least one of a plurality of carriers associated with the call and a telecommunications provider to provide a plurality of CDR groups. A plurality of summary statistics may be calculated for each of the plurality of CDR groups. The plurality of summary statistics include data defining each of the plurality of CDR groups. The calculated plurality of summary statistics may be analyzed for each duration bin to determine whether an anomaly is present. A value may be assigned to each duration bin, the value being indicative of whether an anomaly is present. An external ticket may be generated informing affected carriers or telecommunications provider when an anomaly is present.

Related systems and non-transitory computer readable medium are also provided.

BRIEF DESCRIPTION OF THE DRAWINGS

FIG. 2 is a block diagram illustrating fields in an example Call detail record (CDR) in accordance with some embodiments of the present inventive concept.

FIG. 3 is a flowchart illustrating operations for initiating a call and storing details thereof in a CDR in accordance with some embodiments of the present inventive concept.

FIG. 5 illustrates fields in the CDR including a calculated duration in accordance with some embodiments of the present inventive concept.

FIG. 6 illustrates fields in the CDR including proportional fields in accordance with some embodiments of the present inventive concept.

FIG. 8 illustrates fields of the CDR including non-anomalous local outlier factors (LOFs) in accordance with some embodiments of the present inventive concept.

FIG. 9 illustrates fields of the CDR including anomalous LOFs in accordance with some embodiments of the present inventive concept.

DETAILED DESCRIPTION OF EMBODIMENTS

Figure 1:
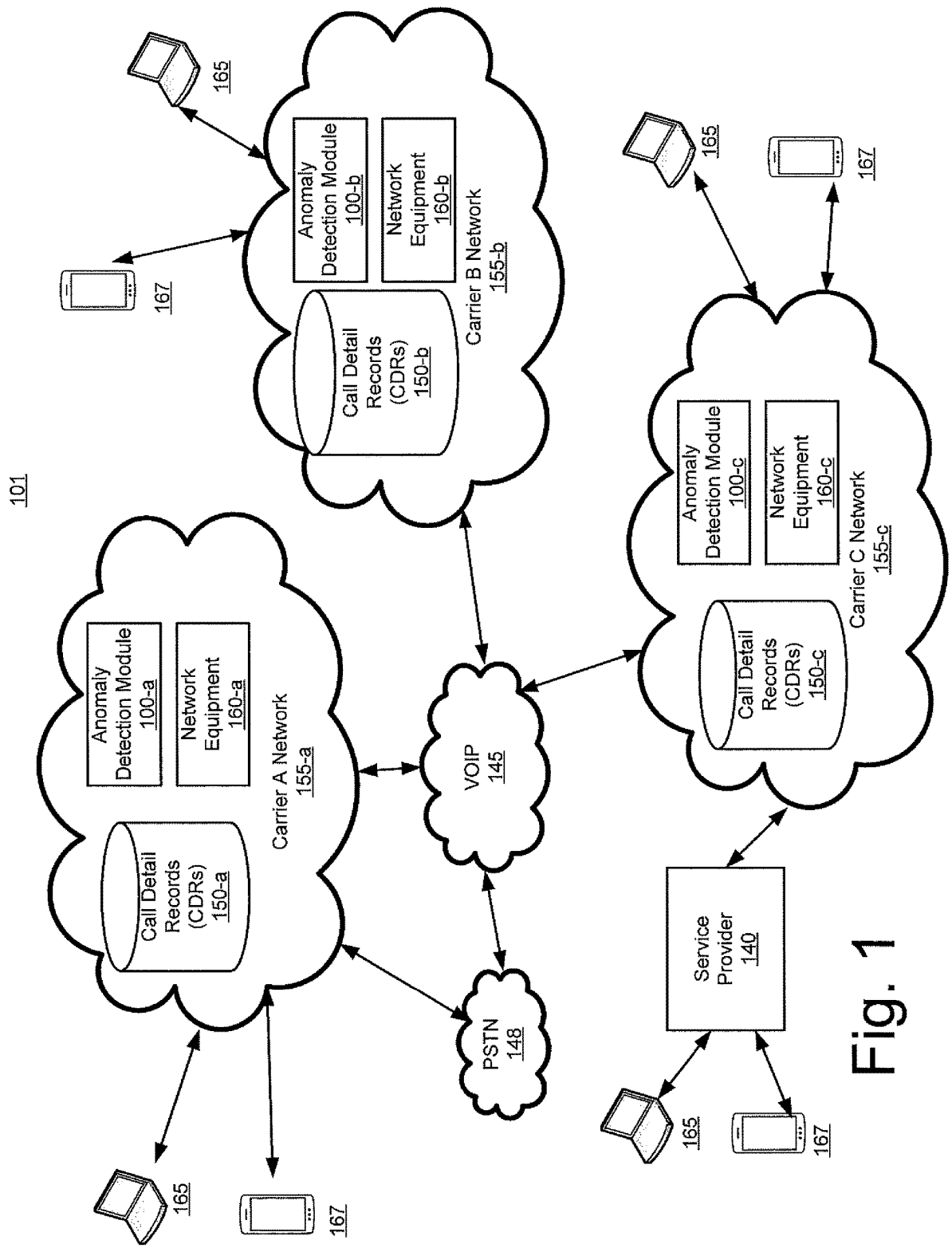
FIG. 1 is a block diagram illustrating a network including an anomaly detection module in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, inadvertent anomalies that occur in a telecommunications network may affect call services. When telecommunication carriers do not sustain a guaranteed level of service, customers may look for other carriers. Thus, some embodiments of the present inventive concept are directed to detecting anomalies in the telecommunications network that may cause unforeseen decreases in a quality of service provided to a customer. In particular, some embodiments of the present inventive concept are directed to anomalies located by analyzing details associated with calls made in the telecommunications network (call data) as will be discussed further herein.

As used herein, "anomaly" refers to a deviation from what is standard, normal, or expected. There are different types of anomalies in the context of the present inventive concept. For example, "threshold anomalies" and "contextual anomalies." As used herein, a "threshold anomaly" refers to an anomaly that is defined solely based on a value crossing over some chosen threshold. For example, if for a given time interval (e.g. hour of time), an average length of calls (ALOC) for a particular Customer A drops below 20 minutes, this hour of time (time interval) represents an anomaly. In this example, the arbitrary value of 20 minutes is chosen as the threshold beforehand. In other words, the threshold of 20 minutes is predefined. A "contextual anomaly," on the other hand, refers an anomaly that is defined partially based on "contextual" information, such as a time of day, or when compared to other data points. Thus, rather than an arbitrary threshold, the context of when the calls are made or where the calls are made from may be taken into account. Contextual anomalies may be further separated into time series based anomalies and non-time series based anomalies.

"Time series based contextual anomalies" refer to anomalies defined relative to time. For example, if the ALOC drops below 20 minutes (threshold) for Customer A at 4:00 AM, it may not be considered an anomaly if calls in the early morning tend to be shorter than calls made later in the day. However, if the ALOC drops below 20 minutes at 11:00 AM, it may be considered an anomaly as calls made during the daytime hours tend to last longer. Thus, the context of the call being made at 4:00 AM versus 11:00 AM can affect whether the situation is considered an anomaly. It will be understood that this example uses both a threshold of 20 minutes and a time component, but a time component is used to fully define a time series anomaly.

"Non-time Series based contextual anomalies" refer to anomalies that are partially defined based on contextual information other than time. For example, if 100 calls from Raleigh to Denver disconnect at exactly 3:13:07 PM, and sixty five percent of these calls appear to be redialed, this represents a potential call drop anomaly, likely due to a technical issue, such as a fiber optic cable cut or the like. This anomaly is partially defined based on time, i.e. all of the calls end at the same time, but is also defined based on a non-time based factor, i.e. the redial percentage.

It will be understood that the additional dimension of "redial percentage" helps to determine if this is an anomaly worth investigating. For example, if the redial percentage is only five percent, an assumption may be made that this was just a large conference call ending, and there may be nothing anomalous worth investigating. However, a larger redial percentage of sixty five percent indicates that the call was ended prematurely.

A specific use case of anomaly detection will now be discussed below with respect to the Figures. It will be understood that although embodiments discussed herein relate to conference call traffic and identifying conference calls terminated prematurely due to expiration of a session timer implemented by the carrier associated with the call, embodiments of the present inventive concept may be used in combination with identification of other anomalies. For example, data may be analyzed in accordance with embodiments discussed herein to determine if a physical line has been cut. All calls would be dropped at a same time but for a different reason, i.e. not the expiration of a session timer.

Referring now to FIG. 1, a block diagram illustrating an example system 101 according to some embodiments of the present inventive concept will be discussed. As illustrated, the system 101 includes a voice over internet protocol (VoIP) network 145; a public switched telephone network (PSTN) 148; a plurality of carrier networks, for example, Carrier A Network 155-a, Carrier B Network 155-b and Carrier C Network 155-c; a service provider 140 and a plurality of endpoints 165 and 167 in communication with the Carrier Networks 155-a, 155-b and 155-c and the service provider 140 in accordance with some embodiments discussed herein.

The VoIP network 145 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The plurality of endpoints may include an internet of things (IoT) endpoint 165 and/or a telephony endpoint 167. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VoIP phone, IoT device, or another telephonic device. The endpoints 165 and 167 communicate through the networks 145 and 148 and the Carriers 155-*a*, 155-*b* and 155-*c*.

As further illustrated in FIG. 1, each Carrier network 155-*a*, 155*b* and 155-*c* may include call detail records (CDR) 150-*a*, 150-*b* and 150-*c*; network equipment 160-*a*, 160-*b* and 160-*c*; and an anomaly detection module 100-*a*, 100-*b* and 100-*c*, respectively, in accordance with embodiments discussed herein. The network equipment 160-*a*, 160-*b* and 160-*c* may illustrate any hardware used to send, receive, and route calls at the Carrier Network 155-*a*, 155-*b* and 155-*c*.

The anomaly detection module 100-*a*, 100-*b* and 100-*c* may provide methods, systems and computer program products for detecting anomalies in the telecommunications network and informs the telecommunications Carrier 155-*a*, 155-*b* and 155-*c* of these anomalies such that the carriers may address the same. As used herein, the term a "telecommunications carrier" may refer to any provider of telecommunications services. FIG. 1 also includes a service provider 140. It will be understood that a carrier, such as Carrier A, B and C in FIG. 1 may be a service provider, for example, Bandwidth, Verizon, AT&T and the like. However, the reverse is not true, a service provider 140 is not necessarily a carrier. In embodiments where the service provider 140 is not a carrier, the service provider 140 may be a customer of the Carrier. FIG. 1 illustrates, the service provider 140 being a customer of Carrier C 155-*c*. It will be understood that although the service provider 140 is shown as only being a customer of Carrier C 155-*c*, embodiments of the present inventive concept are not limited thereto. The service provider 140 may be customer of other Carriers or there may be additional service providers in the system 101 without departing from the scope of the present inventive concept.

As discussed above, some embodiments of the present inventive concept discuss identifying conference calls that may have inadvertently been terminated based on a preset session timer implemented by, for example, Carrier A 155-*a*, Carrier B 155-*b* or Carrier C 155-*c*. Although only three carriers are illustrated in FIG. 1, it will be understood that less or more than three Carriers may be present in the system without departing from the scope of the present inventive concept. Any of these carriers may have session timers installed on their networks, for example, for calls to locations such as India and Greece. These are generally present to reduce costs associated with calls that were accidently left open (no hang up). But conference calls can last longer than the preset 60, 90, 120 minutes etc. session timers and when these calls are cut off prematurely due to the session timer, customers may be unhappy. Accordingly, some embodiments of the present inventive concept identify the anomaly so that it can be remedied, and the customer can be satisfied.

The anomaly detection module 100-*a*, 100-*b* and 100-*c* includes various modules and data such as, for instance, a calculation module, duration bins, summary statistics and an external ticket generator. It will be understood that these modules and data are provided for example only and, therefore, embodiments discussed herein are not limited thereto. For example, the modules and data may be combined or split into additional modules/data without departing from the scope of the present inventive concept.

Referring again to FIG. 1, the anomaly detection module 100-*a*, 100-*b* and 100-*c* has access to call detail records (CDRs) 150-*a*, 150-*b* and 150-*c*. The anomaly detection module 100 may have direct access to the CDRs 150-*a*, 150-*b* and 150-*c*, in fact, the CDRs 150-*a*, 150-*b* and 150-*c* may be part of the anomaly detection module 100 in some embodiments. However, the CDRs 150-*a*, 150-*b* and 150-*c* may be separate from the anomaly detection module 100. Similarly, the external ticket generator provides a ticket to a Carrier (155-*a*, 155-*b*, 155-*c*) when an anomaly is detected. This ticket may be provided directly to the Carrier (155-*a*, 155-*b*, 155-*c*) or may be provided through the network 145 without departing from the scope of the present inventive concept.

As used herein, a "CDR" is a record of a transaction of an individual call across a network. The CDRs 150-*a*, 150-*b* and 150-*c* represent a database including many CDRs. The anomaly detection module 100 uses the CDRs in the database 150-*a*, 150-*b*, 150-*c* to determine information about the network. A single CDR represents a single set of fields associated with a single transaction (call) in these datasets. The data fields used for the current use case are discussed below with respect to FIG. 2. However, a CDR may include additional fields or fewer fields based on the anomaly being detected.

Referring to FIG. 2, a diagram illustrating the relevant fields in the CDR will be discussed. The CDR databases 150-*a*, 150-*b* and 150-*c* illustrated in FIG. 1 will be referred to herein collectively as "CDR database 150." As illustrated, each CDR 251 in the CDR database 150 includes the following fields: carrier_name; customer_sbc_invite_time (Time Stamp_Call Invite Received); customer_sbc_answer_time (Time Stamp_Call Answered); customer_sbc_disconnect_time (Time Stamp_Call Disconnected); customer_sbc_disconnecting_party (Disconnecting Party); calling_number (Calling_Telephone Number); and called_number (Called_Telephone Number). Each field will be discussed below.

The carrier name refers to a telecommunications provider. As used herein, "carrier" or "carrier name" refers to a telecommunications provider that receives the call from the network 145/148 first, i.e. the carrier that immediately receives the traffic, not any other intervening provider. For example, if a customer sends outbound international traffic to the network, the network might send this traffic to Carrier A 155-*a* who then might send it to Carrier B 155-*b* and so on. Thus, the only known carrier information is the first Carrier to receive the data and the "Prefix Code Owner," discussed below, where the call ends. Thus, all carriers in the flow may not be known.

The customer_sbc_*_time fields, customer_sbc_invite_time, customer_sbc_answer_time and customer_sbc_disconnect_time are all fields in the CDR 251 that represent different timestamps associated with a single call, from the perspective of the network's session border controller (SBC) assigned to a particular customer. These fields are time stamps that indicate when the call invite happened, when the call was answered and when the call was disconnected, respectively. As will be discussed further below, these fields in the CDR 251 can be used to calculate a duration (length) of a call, i.e. call duration is the time between the answer time and the disconnect time.

The customer_sbc_disconnecting_party field indicates which side of the call terminated (ended) the call. For example, for outbound calls, a value of 1 in this field may indicate that the calling party ended the call, and a value of 2 in this field may indicate that the called party ended the call. This method is provided as an example only and other methods may also be used. In some embodiments, the disconnecting party is equivalent to which party sends a session initiation protocol (SIP) BYE direction. SIP is a protocol used in VoIP communications that allows users to make voice and video calls. A SIP BYE is a SIP request used to terminate a session.

The calling_number field includes the phone number of the calling party and the called_number field includes the phone number of the called party. As discussed above, the CDR 251 of FIG. 2 is not an exhaustive list of CDR fields, but is provided an example to allow discussion of a use case herein.

Referring now to the flowchart of FIG. 3, an example of operations for beginning a call and storing the call details in a CDR 251 will be discussed. As illustrated in FIG. 3, operations begin at block 300 by an end user having the calling_number dial the called_number. In the conference call example, the end user dials a conferencing enabled telephone number, which creates the conference call. Via SIP, the call, for example, the conference call, may be set up (block 310). The various SIP legs used to set up and complete the call typically traverse multiple "carriers." Information about the individual SIP legs a single carrier is responsible for are correlated into the CDR 251 (block 320). The CDR 251 is then stored in the CDR database 150 (block 330). The operations illustrated in FIG. 3 may be performed on an ongoing basis as calls are made. The flowchart of FIG. 3 is provided as an example only and, thus, it is understood that CDRs can be created using different operations.

Referring now to the flowchart of FIG. 4, operations for detecting anomalies in a telecommunications network by analyzing details associated with calls made in the telecommunications network will be discussed. The specific example operations relate to the use case for detecting calls dropped due to expiration of session timers for outbound conferencing calls to, for example, India, in accordance with some embodiments of the present inventive concept will be discussed. However, embodiments discussed herein are not limited to this use case. As used herein, "session timers" refer to timers placed on individuals calls causing calls to automatically disconnect after a predetermined length of time. For example, these timers may be exactly 60 minutes, 90 minutes, 100 minutes, 120 minutes and the like, but may have any value. These session timers often cause issues with the network in outbound international traffic to, for example, traffic being sent to India. In many cases, the session timers are set up by a party on the called side. For example, a local telecommunications provider in India may install session timers on their network. Presumably, these timers are installed to disconnect calls that have been left connected by mistake, to save costs. In general, most international calls do not typically exceed 60 or 90 minutes, but business conference calls often do. Thus, when these conference calls extend beyond the session timer, the calls are terminated prematurely and may result in very unhappy customers. Thus, some embodiments discussed herein detect anomalies in a telecommunications network by analyzing details associated with calls made in the telecommunications network.

The anomaly detection module 100 (FIG. 1) "fetches" the CDRs from the CDR database 150 (FIG. 1). In some embodiments, historical CDR data may be fetched (obtained) from the CDR database 150. As discussed above, this CDR database 150 may be maintained by the anomaly detection module 100 or may be remote therefrom without departing from the scope of the present inventive concept. For example, the historical CDR data may include all relevant CDRs from the past 3 to 14 days. A random sample may not be taken and the exact number of days that is needed may depend on the use case. Hereinafter, this historical dataset that is fetched from the CDR database 150 is referred to as the "CDR dataset." As discussed above, the following fields are fetched from the CDR (see FIG. 2): carrier_name; customer_sbc_invite_time; customer_sbc_answer_time; customer_sbc_disconnect_time; customer_sbc_disconnecting_party; calling_number; and called_number. In some embodiments, all CDR data from the CDR database containing information about all calls to, for example, India, that occurred within the defined historical period may be fetched, which may include a CDR dataset including between 50,000 and 150,000 individual CDRs. These numbers are provided for example only.

Figure 4:
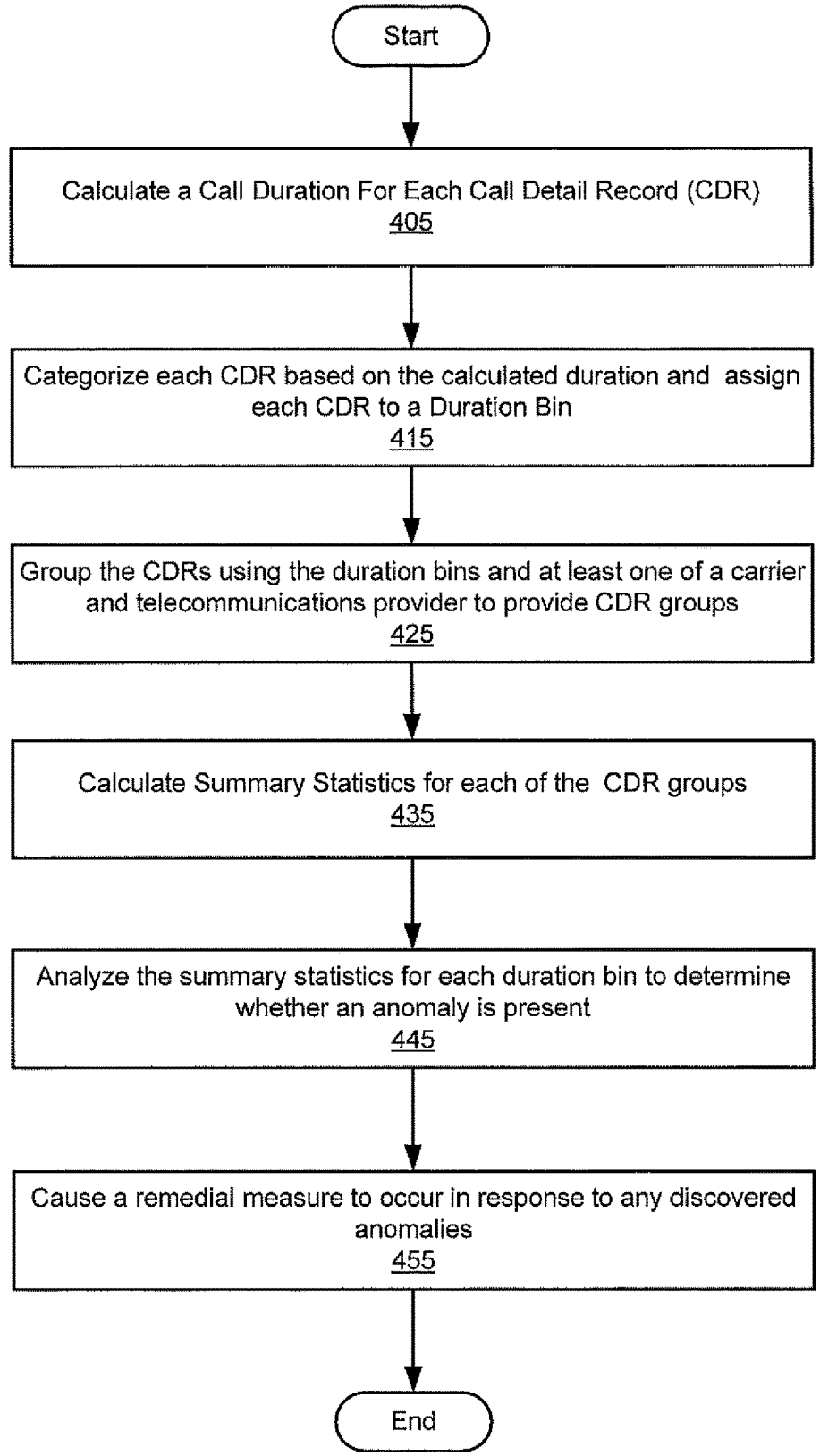
FIG. 4 is a flowchart illustrating operations for detecting an anomaly in accordance with various embodiments of the present inventive concept.

Once the historical CDR data is fetched from the CDR database 150, operations begin at block 405 of FIG. 4 by calculating a call duration for each call associated with a fetched CDR in the CDR data (calculation module) since this field is not currently present in the CDR 251. The call duration of each individual call is calculated as follows:

$$\text{Call Duration} = \text{customer\_sbc\_answer\_time} - \text{customer\_sbc\_disconnect\_time} \quad \text{Eqn. (1)}$$

where the call duration is the length of the call; the customer_sbc_answer_time is the time the call is answered and the customer_sbc_disconnect_time is the time the call is disconnected. The call duration is calculated for each individual call associated with an individual CDR in the fetched CDR data.

Once the call duration field is calculated for all of the calls, the CDR data is grouped based on call duration (length of the call) using the newly calculated call duration bin field (block 415). The "call duration bins" may be defined using any length of time that may be meaningful for embodiments of the present inventive concept. Each of the calls associated with an individual CDR is assigned to a call duration bin containing calls having similar call durations, i.e. the calls are binned up based on duration. In other words, each of the calls are categorized based on the calculated call duration for each call and assigned to a duration bin (duration bins) including calls having similar calculated call durations.

In some embodiments, a width of the bin (bin width) of six (6) seconds may be used to define the bin. In other words, all call durations within a six (6) second window will be allocated to a same bin. However, it will be understood that other lengths of time may be used without departing from the scope of the present inventive concept.

Using the example of outgoing calls to India, these calls may have different durations. For example, three calls might last 3,601 seconds; 3,614 second and 4,202 seconds. Using a six (6) second bin width: the 3,601 second call would be assigned to the [3600, 3606) bin; the 3,614 second call would be assigned to the [3612, 3618) bin; and the 4,202 second call would be assigned to the [4200, 4206) bin. The notation [x, y) denotes Mathematical [inclusive, exclusive) notation and indicates, for example, the [3600, 3606) bin contains the 3600.000 value and the 3605.999 value, but not the 3606.000 value. This is provided for example only and it is understood other methods and bin widths may be used without departing from the scope of the present inventive concept. For example, for convenience, the bin widths can be represented by just the left-hand portion (short hand—3600, 3612, 4200) value, and may be written in units of minutes not seconds.

FIG. 5 illustrates three fields in the CDR, specifically, Time Stamp_Call Answered (column A); Time Stamp_Call Disconnected (column B); and the calculated call duration (column C). In FIG. 5, the calculated call duration field (column C) is provided in minutes not seconds. As shown, the call durations range from 32.2 minutes to 46.6 minutes.

Once all the call durations are calculated for each CDR in the CDR data, the CDRs are grouped together using the duration bins and at least one of a plurality of carriers associated with the call and a telecommunications provider to provide a plurality of CDR groups (block 320). In particular, the CDR data may be grouped, or aggregated, using one of the following combinations: call duration bin and carrier; call duration bin and prefix code owner; and call duration bin, carrier, and prefix code owner.

Which grouping structure used may depend on the exact need or use case. While all three might provide value, one combination might be more useful than another in a specific situation. For example, if a single prefix code owner has a session timer installed, it is likely more useful to group the CDR data on just the call duration bin and prefix code owner combination. Doing so would allow the offending prefix code owner to stand out more (and thus receive a higher LOF score which will be discussed below). In contrast, if the group was also defined by the carrier, calls that traveled over different carriers to the same prefix code owner would not be grouped together, and the offending prefix code owner might not stand out as much.

As used herein, a "prefix code owner" refers to the telecommunications provider ("owner") of a particular phone number prefix ("code prefix"). For example, in a North American Dialing Plan, the prefix code refers to the first six digits of a phone number (excluding country code). For example, in the phone number 919-356-1234, the 919-356 portion is the prefix code. In the United States, phone number portability makes identification using the prefix code harder as a person that has an area code indicting a location in California may actually be in New York. Many other countries do not support user phone number portability, so blocks of numbers are owned by telecommunications providers. The Prefix Code Owner of the called party can be determined by looking at the called_number field in the CDR dataset, and matching it with data from the Local Exchange Routing Guide (LERG) database. LERG is a database that provided information regarding owned prefix codes (NPA-NXX) at the block level. The LERG is updated monthly and highlights the call routing activity that occurs over the public switched telephone network (PSTN) by service providers.

Once the CDR dataset has been grouped as discussed above, the CDR data set can be manipulated and searched. In some embodiments, summary statistics are calculated for each of the CDR groups (block 435). The summary statistics include data defining each of the plurality of CDR groups as will be discussed below.

The summary statistics are calculated for the grouped CDR dataset. For example, the following summary statistics may be calculated: Number of Calls; Average number of calls, on a rolling basis; Proportional change in the number of calls; Proportional number of calls with the BYE direction from the called number side; and Proportional number of calls that appear to be redialed. It will be understood that these summary statistics are provided for example only and that other summary statistics may also be calculated without departing from the scope of the present inventive concept.

The summary statistics will be explained in more detail herein. The Number of Calls refers to the count of calls in the dataset that ended with each unique grouping combination. The Average number of calls, on a rolling basis refers to the average number of calls for each unique grouping combination, on a two minute rolling basis (although some of the length of rolling time would also be useful). For example, the average number of calls for Carrier A and Prefix Code Owner X at the 25.0 minute duration is the average number of calls with durations between 24.0 and 25.9 minutes. The average number of calls for Carrier A and Prefix Code Owner X at the 25.1 minute duration is the average number of calls with durations between 24.1 and 26.0. Any value may be chosen for the rolling window, embodiments are not limited to two minutes.

Proportional change in the number of calls refers to the proportional change in the number of calls that end at a given duration with a given carrier and/or prefix code owner, as compared to the rolling average. This field is an estimate for how many more or less calls end at a given duration versus and expected number of calls that end at similar durations. It will be understood that the summary statistics number of calls and average number of calls, on a rolling basis are calculated so that proportional change in the number of calls can be calculated.

Proportional number of calls with the BYE direction from the called number side refers to the proportion of calls that end at a given duration for a given carrier and/or prefix code owner where the disconnecting party is the called number side. For example, if there are 10 calls that end at 25.0 minutes with Carrier A, and 8 of these calls were disconnected by the called number side, then the proportion here would be 0.8. The Proportional number of calls that appear to be redialed refers to the proportional number of calls that end at a given duration with a given carrier that appear to be redialed. As used herein, a "redial attempt" refers to an event where a same calling number dials a same called number within three minutes of disconnecting. Different time limits may be used.

Thus, these summary statistics are calculated for each unique grouping combination to provide a summarized dataset. FIG. 6 illustrates the fields of the summarized dataset, specifically proportional summary statistics for the carrier "Carrier A" for the calls occurring in the 25.0-26.5 call duration bins. In particular, FIG. 6 illustrates the following summary statistics: Carrier Name (Column A); the call duration in minutes (Column B); the proportional change in the number calls (Column C); the proportion of calls redialed (Column D) and the proportional of calls with "Bye" from called number party (disconnecting party) (Column E).

Once all the summary statistics are calculated, the summary statistics may be analyzed for each duration bin to determine whether an anomaly is present (block 445). For example, each of the duration bins may be assigned a value that is indicative of whether an anomaly is present. As understood by those of skill in the art, there are number of values that may be assigned to the data to indicate whether an anomaly may be present. Embodiments of the present inventive concept are discussed with respect to a Local Outlier Factor (LOF); however, embodiments of the present inventive concept are not limited thereto. LOF and the details associated therewith will be discussed below with respect to the flowchart of FIG. 7.

Once the value is assigned to each duration bin, some embodiments of the present inventive concept generate an external ticket informing "affected" carriers or telecommunications provider when an anomaly is present (block 455). As used herein, "affected carriers" refer to carriers that have been identified as experiencing the anomaly, i.e. that session timers are expiring and causing conference call to be prematurely terminated.

Referring to the flowchart of FIG. 7, a more detailed block diagram of operations for detecting an anomaly in accordance with some embodiments of the present inventive concept will be discussed. Operations illustrated in FIG. 7 occur after calculating summary statistics in block 435 of FIG. 4 and expand on an example of analyzing the summary statistics of block 445 of FIG. 4. As discussed above, embodiments illustrated in the flowchart of FIG. 7 utilize an LOF score or value to provide an indication of anomalous data. LOF is an algorithm used for finding anomalous data points. LOF is a density-based unsupervised machine learning algorithm. In other words, individual data points are compared to other nearby data points, to see how much they differ from one another. The data points that differ significantly from other nearby data points are given a high LOF value (sometimes referred to as a LOF score), and may indicate the presence of anomalies. In contrast, the data points that do not differ significantly from other nearby data points are given a low LOF, and may indicate the that an anomaly is not present. The Local Outlier Factor model is trained on data, and each data point is assigned an LOF, which will be discussed further below. Other machine learning algorithms may be used without departing from the scope of the present inventive concept.

Figure 7:
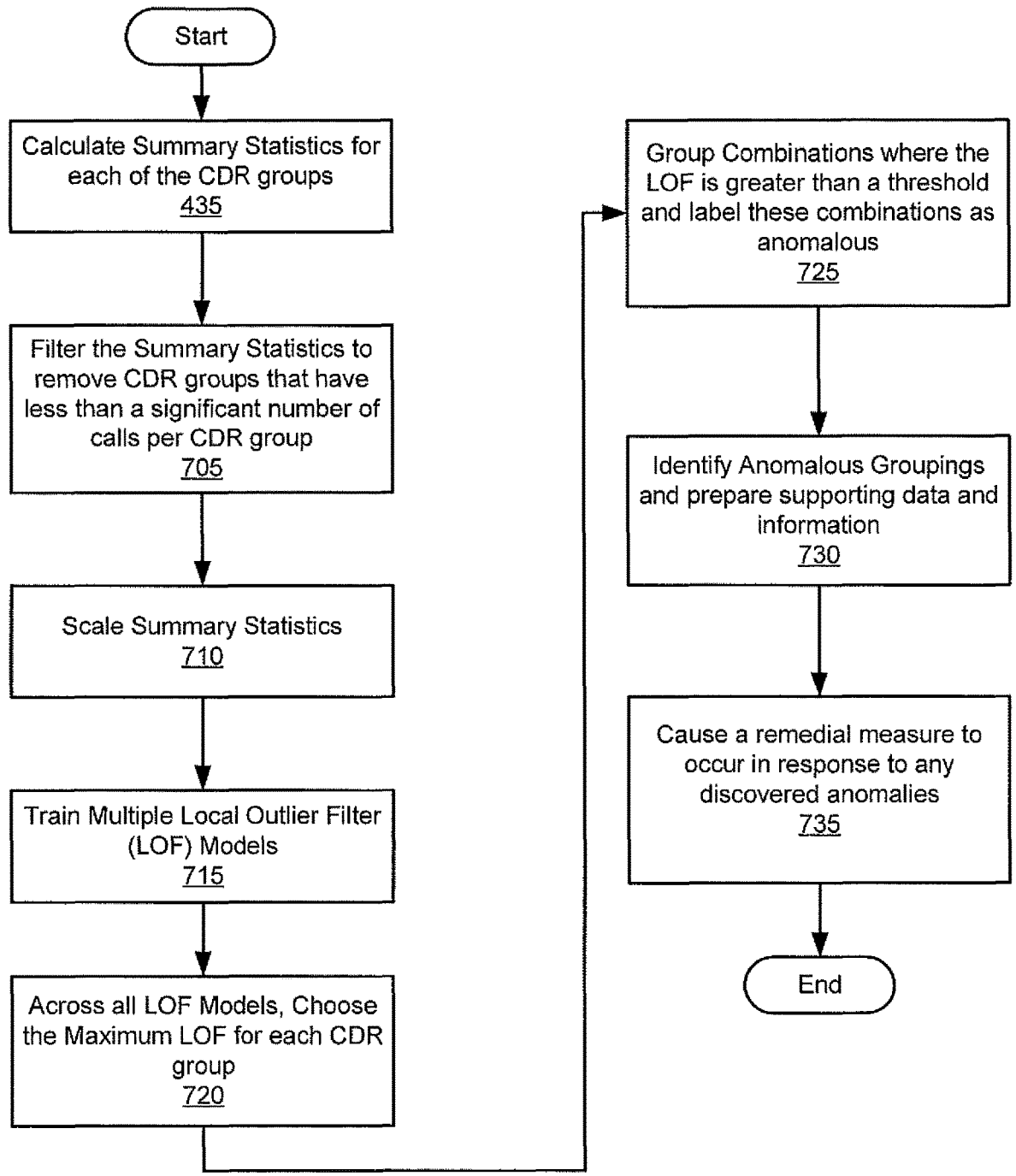
FIG. 7 is a more detailed flowchart than the flowchart of FIG. 4 illustrating operations for analyzing the CDR dataset in accordance with some embodiments of the present inventive concept.

As illustrated in the flowchart of FIG. 7, operations proceed from calculating the summary statistics (block 435) as discussed above to filtering the summary statistics (block 705). In some embodiments of the present inventive concept the summary statistics may be filtered for "low volume groups." In particular, if the total number of calls in a CDR group is less than a significant number of calls, for example, less than 10 calls, this group is filtered out before data is further analyzed in accordance with embodiments discussed herein. In other words, if the group is so small that the results produced therefrom may not be useful, these groups may be filtered out. As used herein, "less than a significant number" refers to a small number of calls, which may vary depending on the actual situation. For example, in some embodiments, the number may be less than 3, less than 5 or less than 10.

After filtering operation proceed to scaling the summary statistics (block 710). In some embodiments, only the three proportional fields (Proportional change in the number of calls; Proportional number of calls with the BYE direction from the called number side; and Proportional number of calls that appear to be redialed) are scaled. These summary statistics may be scaled using any method know to those having skill in the art. As used herein, "scaling" refers to using a statistical scale analysis or set of methods to analyze the summary statistics, specifically the three proportional fields. In other words, the summary statistics are organized based on one or more specified rules.

Some embodiments of the present inventive concept us a normalization method to scale the summary statistics, however, embodiments of the present inventive concept are not limited to this method. Normalization methods are used to scale data so that it falls in a smaller range, which is generally useful when dealing with attributes on different scales. When multiple attributes are there but attributes have values on different scales, this may lead to poor data models while performing data mining operations. So they are normalized to bring all the attributes on the same scale.

Some embodiments of the present inventive concept use a Z-score normalization method, although other scaling methods, such as Decimal Scaling or Min-Max Normalization, could also be used. As used herein, Z-score normalization centers each of the proportional fields about 0, and divides each of the values by a standard deviation of the entire field. This is done so that one field does not outweigh other fields during model training (discussed below) in the event it has a much larger range than another field. As used herein, "standard deviation" refers to a quantity calculated to indicate the extent of deviation for a group as a whole.

Once the summary statistics have been scaled (block 710), the scaled summary statistics are trained using the summarized dataset and the LOF algorithm (block 715). Multiple models are trained using only the three proportional fields. Before training any models, a range of k values is chosen. As used herein, "k" represents a neighborhood size to be used when training an individual LOF model. In some embodiments, a range of k values between 10 and 40 may be used. For each value of k, an individual LOF model is trained. If the range of k were 20-29, then ten (10) individual LOF models would be trained, all using the same scaled training data.

The process of training an unsupervised machine learning model can be generally described as successively comparing data points to other data points, or comparing subsets of data points to other subsets of data points. This may take place by determining which data points are near other data points, and how far away these data points are from each other. In some embodiments, this may take place by subdividing data repeatedly into subsections, to learn which divisions are most beneficial to obtain some measure of internal subset homogeneity, but external subset heterogeneity. It will be understood that this is provided as an example only and other methods of unsupervised machine learning may be used without departing from the scope of the present inventive concept.

Each of the, for example, ten (10), LOF models return a local outlier factor for each set of data points. If ten (10) LOF models are trained, then ten (10) LOFs are assigned to each set of data points. Among all of the LOFs returned by each of the ten (10) models, the maximum value is chosen for each set of data points (block 720). This process of training multiple models and selecting the maximum value over a range of k values is performed to improve result stability.

Once the three proportional fields from the summarized dataset have been scaled (block 710) and the multiple LOF models have been trained using different values of k (block 715), indicating the neighborhood size, for each grouping combination, the maximum LOF over all the trained models is taken (block 720). FIG. 8 illustrates LOFs in Column F for calls carried by Carrier A (Column A) for the 25.0 to 25.5 call duration bins. Note, all values of LOF (local_outlier_factor–Column F) are around 1. The columns illustrated in FIG. 8 show the following fields: carrier_name (Column A); the call duration in minutes (Column B); the proportional_change_number_calls (Column C); the proportional_redials (Column D); the proportional_called_disconnecting_party (Column E); and the local_outlier-factor (Column F).

Similarly, FIG. 9 illustrates the same CDR including the following fields: the following summary statistics: carrier_name (Column A); the call duration in minutes (Column B); the proportional_change_number_calls (Column C); the proportional_redials (Column D); the proportional_called_disconnecting_party (Column E); and the local_outlier-factor (Column F). However, FIG. 9 illustrates the top five (5) LOFs for Carrier A. Note, in FIG. 9, the local_outlier_factor values are all well above 1, and the call_duration_minutes values are all around 60, 90, 100 or 120, indicating likely session timers.

The LOF may be any value between 0 and infinity and an LOF is assigned to each unique grouping combination. In some embodiments, a value around 1.0 indicates a non-anomalous data point and a value above 1 indicates an anomalous data point. Thus, using a constant threshold value, any unique grouping combination with a local outlier factor above the threshold should be labeled as anomalous, and thus a probable session timer (block 725). In some embodiments, the constant threshold value may be two (2) or three (3), however, embodiments of the present inventive concept are not limited thereto.

The summarized dataset, which now includes LOF scores/values and labels indicating if a unique grouping combination is anomalous or not, is filtered (block 730). For example, in some embodiments, any grouping combination that has been labeled as anomalous is retained and non-anomalous grouping combinations are filtered out.

For the grouping labeled as anomalous, supporting data and information related to the anomaly is prepared so that a carrier/prefix code owner associated with the anomalous data can be notified. The supporting data may include summary statistics and session timer duration values that may be extracted from the summarized dataset. Furthermore, all relevant CDRs from the CDR dataset may be extracted. This may include all CDRs that match the call duration bin of the session timer, offending carrier and/or offending code owner.

Using the prepared supporting summarized data and CDRs, an external ticket may be generated and may be automatically sent to the offending carrier (block 735). An automatically created text summary may also be provided.

In another embodiment, in addition to generating and sending an external ticket to the offending carrier notifying them of the anomaly (block 735), the anomaly detection module 100 may include, with the ticket, a request to change or disable the session timer for certain calls from specific sources.

In another embodiment, rather than generating and sending an external ticket to the offending carrier notifying them of the anomaly (block 735), the anomaly detection module 100 may cause future conference calls to be routed away from or around the offending carrier or service provider. For instance, new conference calls may automatically eliminate the offending carrier from the routing logic when setting up the call.

In another embodiment, in addition to generating and sending an external ticket to the offending carrier notifying them of the anomaly (block 735), the anomaly detection module 100 may periodically send test calls to the offending carrier to determine whether the session timer has been removed or disabled for certain calls from specific sources. If the test call passes, the offending carrier may be reinserted into the call routing logic.

In another embodiment, in addition to or rather than generating and sending an external ticket to the offending carrier notifying them of the anomaly (block 735), the anomaly detection module 100 may periodically inform future conference call participants of the session timer limit so as to warn them the call may be terminated prematurely. For instance, there could be an announcement at the beginning of the call as to the time remaining before the session timer gets triggered. Similar announcements may be made at specific points along the way warning the participants how much time remains before the session timer gets triggered. For instance, a brief interruption to declare 10 minutes remain, 5 minutes remain, or one minute remains before the session timer gets triggered.

In another embodiment, rather than generating and sending an external ticket to the offending carrier notifying them of the anomaly (block 735), the anomaly detection module 100 may preserve future conference calls by re-establishing the conference call leg to the offending carrier as it approaches the session timer limit. For instance, for a 90 minute session timer, the anomaly detection module may cause a new call to be established at the 89 minute mark in order to reset the timer. This may entail briefly terminating the leg to the carrier and quickly reestablishing it such that any disruption is minimal. Or, the new leg may be established just prior to terminating the original leg and shifting the traffic on the original leg to the new leg.

As briefly discussed above with respect to FIGS. 1 through 10, some embodiments of the present inventive concept discuss detecting anomalies in a telecommunications network by analyzing details associated with calls made in the telecommunications network. As discussed, historical CDR data is fetched (or retrieved) from a database containing CDR data, then grouped (or aggregated) on categorical fields. For the grouped CDR data, summary statistics are calculated. These summary statistics are used to compare between different groups. In particular, these summary statistics are used as training data for the LOF algorithm. For exactness, the summary statistics are used to train multiple LOF models sequentially, and then an aggregated result from all the individual LOF models is obtained, and a local outlier factor is assigned to each set of data points. This is done to produce more stable results. Finally, a set of data points that receive a local outlier factor above a constant threshold value are labeled as anomalous and thus probable session timers. This method of fetching, grouping, summarizing, model training and data filtering is done in batch fashion. It is repeated periodically (e.g., nightly), so as to be dynamic to recently occurring calls. Once identified, an external ticket including the details of the groups identified is generated and communicated to the carrier or prefix owner. Thus, embodiments of the present inventive concept may allow identification and rectification of anomalies in a telecommunications network, which may improve the overall quality of service provided by the network.

Figure 10:
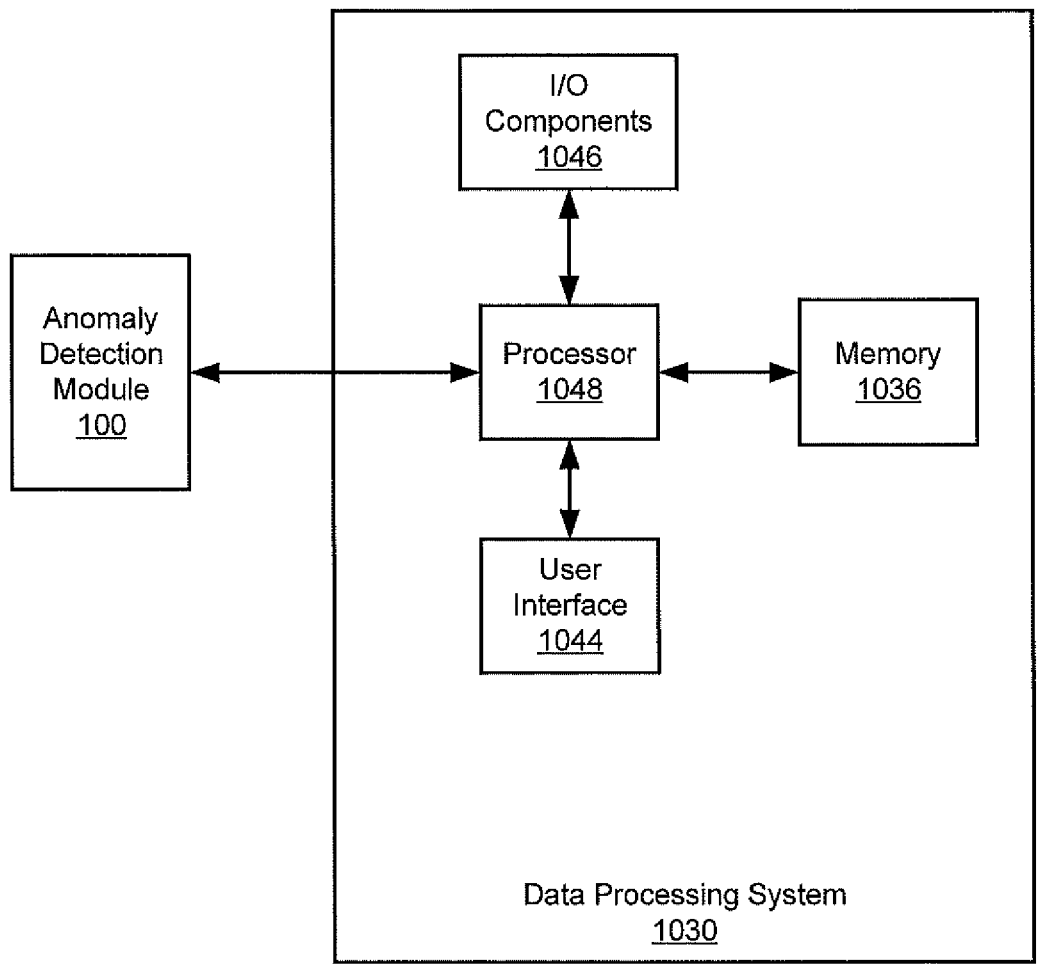
FIG. 10 is a block diagram of a data processing system for use in accordance with some embodiments of the present inventive concept.

Referring now to FIG. 10, an example of a data processing system 1030 suitable for use with any of the examples described above. Although the example data processing system 1030 is shown as in communication with the anomaly detection module 100 in accordance with embodiments of the present inventive concept, the data processing system 1030 may also be part of the anomaly detection module 100 or in any other component of the system 101 without departing from the scope of the present inventive concept. In some examples, the data processing system 1030 can be any suitable computing device for performing operations according to the embodiments discussed herein described herein.

As illustrated, the data processing system 1030 includes a processor 1048 communicatively coupled to I/O components 1046, a user interface 1044 and a memory 1036. The processor 1048 can include one or more commercially available processors, embedded processors, secure processors, microprocessors, dual microprocessors, multi-core processors, other multi-processor architectures, another suitable processing device, or any combination of these. The memory 1036, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 1030.

I/O components 1046 may be used to facilitate wired or wireless connections to devices such as one or more displays, game controllers, keyboards, mice, joysticks, cameras, buttons, speakers, microphones and/or other hardware used to input or output data. Memory 1036 represents nonvolatile storages such as magnetic, optical, or other storage media included in the data processing system and/or coupled to processor 1048.

The user interface 1044 may include, for example, a keyboard, keypad, touchpad, voice activation circuit, display or the like and the processor 1048 may execute program code or instructions stored in memory 1036.

It should be appreciated that data processing system 1030 may also include additional processors, additional storage, and a computer-readable medium (not shown). The processor(s) 1048 may execute additional computer-executable program instructions stored in memory 1036. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure.

Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and That which is claimed is:

1. A method of detecting and responding to anomalies in a telecommunication network by analyzing details associated with calls made in the telecommunications network, the method comprising:
   calculating a call duration for each of a plurality of calls associated with a corresponding call detail record (CDR),
   wherein each CDR provides details associated with a single call in a plurality of fields and wherein the plurality of fields include a time stamp indicating when a call invite is received; a time stamp indicating when the call was answered; a time stamp indicating when the call was disconnected; an indication of which party to the call disconnected the call; a telephone number of a calling party and a telephone number of a called party;
   categorizing each of the plurality of calls based on the calculated call duration for each call such that each of the plurality of calls is assigned to a duration bin, each duration bin including calls having similar calculated call durations;
   grouping CDRs using the duration bins and at least one of a plurality of carriers associated with the call and a telecommunications provider to provide a plurality of CDR groups;
   calculating a plurality of summary statistics for each of the plurality of CDR groups, wherein the plurality of summary statistics include data defining each of the plurality of CDR groups;
   analyzing the calculated plurality of summary statistics for each duration bin to determine whether an anomaly is present, wherein analyzing the summary statistics includes assigning a value to each duration bin, the value indicative of whether an anomaly is present; and
   causing a remedial measure to occur in response to the anomaly.

2. The method of claim 1, wherein the summary statistics for each of the CDR groups comprise:
   a number of calls in the CDR group;
   an average number of calls for each CDR group;
   a proportional change in a number of calls in each CDR group that end at a specific duration compared to a number of calls expected to end at the specific duration;
   a proportional number of calls in each CDR group that end at a given duration where a disconnecting party is the called party; and
   a proportional number of calls in each CDR group that end at a given duration that are redialed.

3. The method of claim 2, further comprising training models using the proportional change in a number of calls in each CDR group that end at a specific duration compared to a number of calls expected to end at the specific duration; the proportional number of calls in each CDR group that end at a given duration where the disconnecting party is the called party; and the proportional number of calls in each CDR group that end at a given duration that are redialed.

4. The method of claim 3, wherein training is preceded by scaling the proportional change in a number of calls in each CDR group that end at a specific duration compared to a number of calls expected to end at the specific duration; the proportional number of calls in each CDR group that end at a given duration where the disconnecting party is the called party; and the proportional number of calls in each CDR group that end at a given duration that are redialed.

5. The method of claim 1, further comprising filtering the plurality of summary statistics to remove CDR groups having less than a significant number of calls in the CDR group.

6. The method of claim 1:
   wherein analyzing the calculated plurality of summary statistics for each duration bin to determine whether an anomaly is present comprises applying an algorithm to calculate a local outlier factor (LOF) for each duration bin.

7. The method of claim 6, wherein the LOF comprises any number greater or equal to zero and wherein an LOF greater than 1 is more indicative of an anomaly.

8. The method of claim 6, further comprising filtering the plurality of summary statistics including LOFs for each duration bin by removing all groupings with an LOF less than a value greater than 1.

9. The method of claim 1, wherein calculating the call duration for each of the plurality of calls is preceded by obtaining historical CDR data for a predetermined period of time, the historical CDR data including all relevant CDRs stored from the predetermined period of time.

10. The method of claim 1, wherein calculating the call duration for each of the plurality of calls comprises calculating a difference between the time stamp indicating when a call was answered and the time stamp indicating when that call was disconnected.

11. The method of claim 1, wherein causing a remedial measure to occur in response to the anomaly further comprises generating an external ticket comprising the plurality of summary statistics, LOFs, and example CDRs.

12. The method of claim 1, wherein the anomaly is related to outbound data conferencing traffic and wherein the anomaly identifies conference calls terminated prematurely due to expiration of a session timer implemented by a carrier associated with the call.

13. The method of claim 12, further comprising generating an external ticket informing the affected carriers or telecommunications provider when a session timer anomaly is present.

14. The method of claim 12, wherein future conference call participants using the carrier with the session timer are warned the call may be terminated prematurely due to the session timer.

15. The method of claim 12, wherein future conference calls route around the carrier with the session timer.

16. The method of claim 12, wherein future conference calls using the carrier with the session timer are reestablished with that carrier just prior to expiration of the session timer causing a new session timer to start.

17. A system for detecting anomalies in a telecommunication network by analyzing details associated with calls made in the telecommunications network, the system comprising:
   a processor; and
   a non-transitory computer readable medium to store a set of instructions for execution by the processor, the set of instructions to cause the processor to:
   calculate a call duration for each of a plurality of calls associated with a corresponding call detail record (CDR), wherein each CDR provides details associated with a single call in a plurality of fields and wherein the plurality of fields include a time stamp indicating when a call invite is received; a time stamp indicating when the call was answered; a time stamp indicating when the call was disconnected; an indication of which party to the call disconnected the call; a telephone number of a calling party and a telephone number of a called party;

categorize each of the plurality of calls based on the calculated call duration for each call such that each of the plurality of calls is assigned to a duration bin, each duration bin including calls having similar calculated call durations;

group CDRs using the duration bins and at least one of a plurality of carriers associated with the call and a telecommunications provider to provide a plurality of CDR groups;

calculate a plurality of summary statistics for each of the plurality of CDR groups, wherein the plurality of summary statistics include data defining each of the plurality of CDR groups;

filter the plurality of summary statistics to remove CDR groups having less than a significant number of calls in the CDR group;

analyze the calculated plurality of summary statistics for each duration bin to determine whether an anomaly is present, wherein analyzing the summary statistics includes assigning a value to each duration bin, the value indicative of whether an anomaly is present; and causing a remedial measure to occur in response to the anomaly.

18. The system of claim 17, wherein the summary statistics for each of the CDR groups comprise:
a number of calls in the CDR group;
an average number of calls for each CDR group;
a proportional change in a number of calls in each CDR group that end at a specific duration compared to a number of calls expected to end at the specific duration;
a proportional number of calls in each CDR group that end at a given duration where a disconnecting party is the called party; and
a proportional number of calls in each CDR group that end at a given duration that are redialed.

19. The system of claim 18, wherein the set of instructions to cause the processor to further train models using the proportional change in a number of calls in each CDR group that end at a specific duration compared to a number of calls expected to end at the specific duration; the proportional number of calls in each CDR group that end at a given duration where the disconnecting party is the called party; and the proportional number of calls in each CDR group that end at a given duration that are redialed.

20. The system of claim 19, wherein the set of instructions to cause the processor to, prior to training, scale the proportional change in a number of calls in each CDR group that end at a specific duration compared to a number of calls expected to end at the specific duration; the proportional number of calls in each CDR group that end at a given duration where the disconnecting party is the called party; and the proportional number of calls in each CDR group that end at a given duration that are redialed.

21. The system of claim 17, wherein the set of instructions to cause the processor to analyze the calculated plurality of summary statistics for each duration bin to determine whether an anomaly is present further comprises a set of instructions to cause the processor to apply an algorithm to calculate a local outlier factor (LOF) for each duration bin.

22. The system of claim 17, further comprising a set of instructions to cause the processor to obtain historical CDR data for a predetermined period of time, the historical CDR data including all relevant CDRs stored from the predetermined period of time before the call duration for each of the plurality of calls is calculated.

23. The system of claim 17, wherein the set of instructions to cause the processor to calculate the call duration for each of the plurality of calls comprises a set of instructions to cause the processor to calculate a difference between the time stamp indicating when a call was answered and the time stamp indicating when that call was disconnected.

24. The system of claim 17, wherein the set of instructions to cause the processor to cause a remedial measure to occur in response to the anomaly further comprises a set of instructions to cause the processor to generate an external ticket comprising the plurality of summary statistics, LOFs, and example CDRs.

25. The system of claim 17, wherein the anomaly is related to outbound data conferencing traffic and wherein the anomaly identifies conference calls terminated prematurely due to expiration of a session timer implemented by a carrier associated with the call.

26. The system of claim 25, the set of instructions to cause the processor to generate an external ticket informing the affected carriers or telecommunications provider when a session timer anomaly is present.

27. The system of claim 25, the set of instructions to cause the processor to:
warn future conference call participants using the carrier with the session timer when a call may be terminated prematurely due to the session timer.

28. The system of claim 25, the set of instructions to cause the processor to:
route around the carrier with the session timer on future conference calls.

29. The system of claim 25, the set of instructions to cause the processor to:
reestablish future conference calls using the carrier with the session timer just prior to expiration of the session timer causing a new session timer to start.

* * * * *